United States Patent
Metzger et al.

(12)

(10) Patent No.: US 6,372,281 B1
(45) Date of Patent: Apr. 16, 2002

(54) PROCESS OF MILLING HARD WHITE WHEAT AND PRODUCTS THEREOF

(75) Inventors: Lloyd E Metzger, Champlin, MN (US); Christopher Jones, Great Falls, MT (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/512,855

(22) Filed: Feb. 25, 2000

(51) Int. Cl.[7] .................................................. A23L 1/10
(52) U.S. Cl. ........................ 426/622; 426/481; 426/482; 426/463; 426/464
(58) Field of Search ............................... 426/622, 463, 426/464, 481, 482

(56) References Cited

U.S. PATENT DOCUMENTS

| | | |
|---|---|---|
| 3,845,229 A | 10/1974 | Rambaud |
| 3,979,375 A | 9/1976 | Rao et al. |
| 4,171,384 A | 10/1979 | Chwalek et al. |
| 4,649,113 A | 3/1987 | Gould |
| 4,986,997 A | 1/1991 | Posner et al. |
| 5,089,282 A | 2/1992 | Wellman |
| 5,104,671 A | 4/1992 | Wellman |
| 5,153,014 A | 10/1992 | Cole, Jr. |
| 5,186,968 A | 2/1993 | Wellman |
| 5,194,276 A | 3/1993 | Hoseney et al. |
| 5,194,287 A * | 3/1993 | Wellman ..................... 426/622 |
| 5,387,430 A * | 2/1995 | Tkac ......................... 426/627 |
| 5,391,389 A | 2/1995 | George et al. |
| 5,498,829 A * | 3/1996 | Goertzen et al. ........... 800/200 |
| 5,871,800 A | 2/1999 | George et al. |
| 6,126,982 A * | 10/2000 | Maldonado ................. 426/549 |

FOREIGN PATENT DOCUMENTS

| WO | WO96/25862 | 8/1996 |
|---|---|---|

* cited by examiner

*Primary Examiner*—Helen Pratt
(74) *Attorney, Agent, or Firm*—John A. O'Toole; Douglas J. Taylor; Everett G. Diederiks, Jr.

(57) ABSTRACT

Improved wheat milling processes for the production of white flour involves selecting a hard white wheat variety for milling, milling the hard white wheat into white patent flour, isolating a high bran stream, size reducing the high bran stream and sifting the size reduced high bran stream into a fine bran and bran flour fractions. The bran flour fraction is then blended with the white patent flour to form a high fiber finish flour which nonetheless is characterized by a white color. The wheat milling processes provide improvements in current wheat milling to increase the milling extraction rate for flour without a decrease in flour quality.

38 Claims, 1 Drawing Sheet

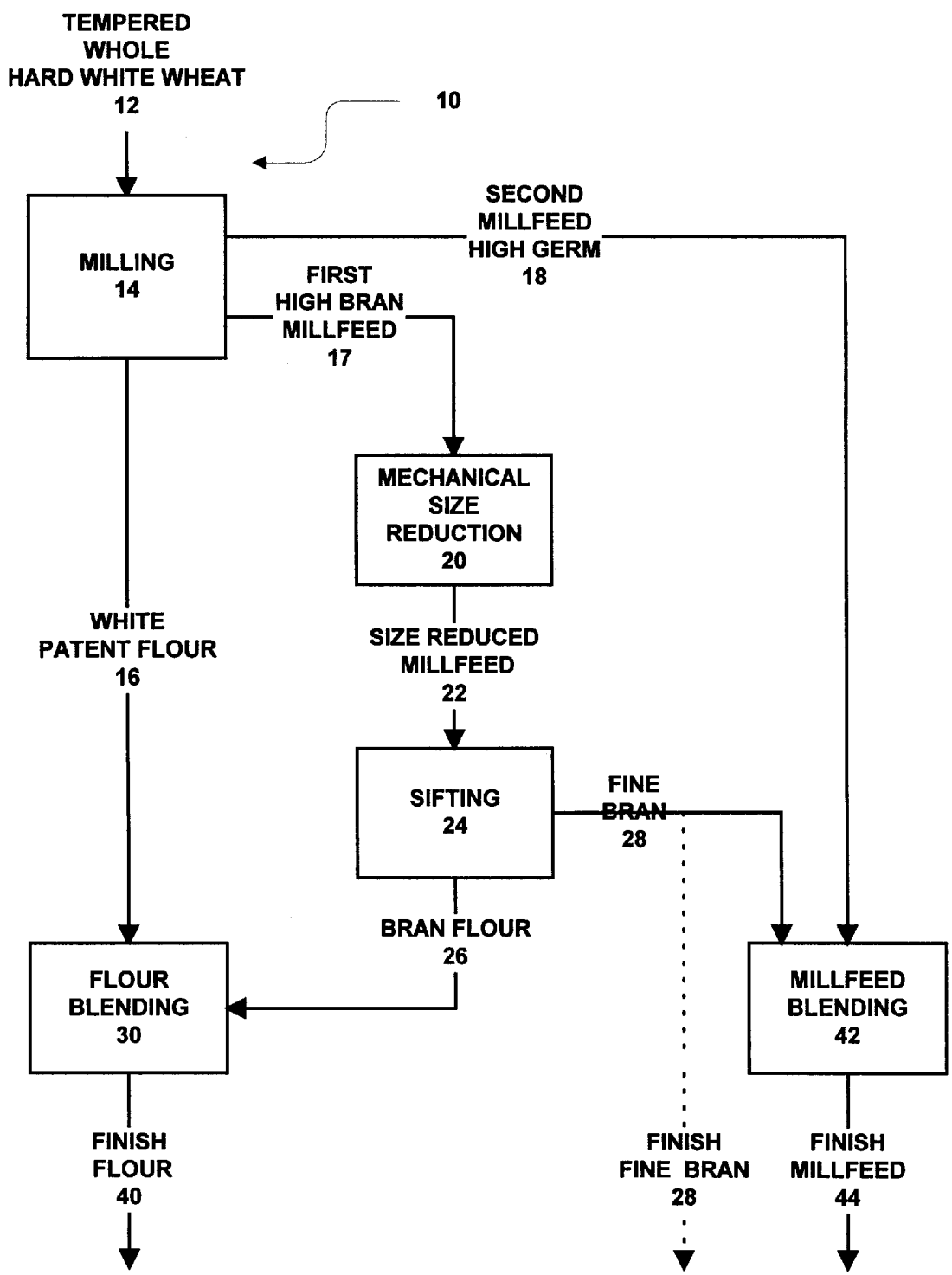

PROCESS OF MILLING HARD WHITE WHEAT AND PRODUCTS THEREOF

FIELD OF THE INVENTION

The present invention relates to food products and to methods for their preparation. More particularly, the present invention is directed towards milled grain products such as wheat flour, to grain intermediate products such as milled bran flours and to their methods of preparation.

BACKGROUND

The present invention provides improvements in current wheat milling processes for the production of white flour. More particularly, the present invention is directed towards improvements in current wheat milling process to increase the milling extraction rate for flour without a decrease in flour quality.

Generally, the present improved process combines using specific varieties of wheat and isolating a specific millstream and mechanically treating that millstream, removing a portion and adding that portion to the flour.

All wheat varieties generically comprise a major starchy endosperm, a smaller germ or sprouting section of the seed and surrounding bran or husk layer. The endosperm makes up about 82–83% of the wheat kernel and is used in the production of flour. Typically, the bran makes up 14–15%, is removed from the kernel and is used in animal and poultry feed. However, the bran can also be milled along with the endosperm to produce whole-wheat flour. The germ is usually separated from the rest of the kernel because its fat content limits the shelf life of the flour. The bran with or without the germ is sometimes referred to as "millfeed". Some special purpose whole grain flours include not only the bran but also the germ fraction. The present methods are directed toward the provision of conventional white flour rather than such whole grain flours.

In the United States, wheat is classified according to whether it is hard or soft, white or red, and winter or spring. As a result there are eight possible designations including: hard white spring, hard red spring, hard white winter, hard red winter, soft white spring, soft red spring, soft white winter, and soft red winter.

The hard or soft designation refers to the hardness characteristics of the wheat kernel. Hard wheat is typically used in bread whereas soft wheat is used in cakes and pastries.

The white or red designation refers to the color of the wheat kernel. Currently red wheat is more readily available in the United States than white wheat. Red wheat has a distinctive taste due to tannins in the bran. To minimize the amount of these flavor-bearing tannins, the wheat grain is milled so as to have as small a fraction as possible of the bran containing these tannins. Conversely white wheat has lighter bran color and less bitter bran flavor as compared to red wheat which results in a milling advantage. Naturally white wheat is also increasingly available commercially and being used more and more.

The winter or spring designation refers to the planting and harvesting time of the wheat. Winter wheat is planted in the fall and harvested in the spring, whereas spring wheat is planted in the spring and harvested later in the fall.

Known milling processes can be adjusted or fine-tuned to obtain an increase in the flour yield but at the cost of including some of the bran. The presence of bran may lower the quality and thus value of the flour more than the increase in the value of the increase in yield. That is, the amount of flour obtained during the milling process is limited by contamination of the flour with bran that deteriorates flour quality. For flour made from red wheat, less bran in the flour can be tolerated due to the presence of more color and flavor tannins in the bran. The darker bran typically makes the flour grayish in color, and also imparts bitter flavors to finished products prepared therefrom.

Even though the endosperm fraction is about 83%, in typical white flour milling process, the extraction rate of white patent flour generally runs only about 72–75%. That is, for every hundred pounds of wheat, about 72–75 pounds of flour is obtained. This flour contains about 1–4% dietary fiber from small amounts of the bran. The balance millfeed is very low value comprising bran and germ although containing some of the desirable endosperm. A common use for such millfeed is for animal feed.

In conventional flour milling, the grain is subjected to a series of milling steps that each involve a break system comprised of a pair of break rolls and an associated set of sieves. Coarser fractions that are removed by the sieves are then subsequently milled by the following break system to progressively size reduce the endosperm to produce flour.

Surprisingly, by selecting a hard white wheat as the starting material and by selecting and mechanically treating a particular sub-stream, a size reduced bran flour intermediate can be prepared that can be added to the white flour to increase the yield of total flour while minimizing the amount of undesirable bran in the finished flour. The present invention thus increases the flour extraction rate without decreasing the quality of flour by excessive bran concentration.

While the total increase in flour extraction is deceptively small, (i.e., an increase in extraction from a conventional 72–78% extraction rate to the improved 78%–86% extraction rate), the value of the improvement is disproportionately great due to the commodity nature of the flour milling industry. Wheat flour milling is a high volume low margin commodity business. Thus, any improvement in yield is very valuable as long as the cost of obtaining the increased yield is low. Due to the high fixed and operating costs of flour milling equipment, this seemingly small improvement in extraction can result in the doubling of the profitability of a flour milling plant.

It is a further advantage of the present invention that the improvements can be easily practiced by existing flour milling plants with only modest equipment changes.

These and further objects and advantages of the present invention will become clearer in light of the following detailed description of an illustrative embodiment of this invention described in connection with the drawings.

BRIEF DESCRIPTION OF THE DRAWINGS

FIG. 1 is a highly schematic representation of the preferred steps for the processing of hard white wheat into white patent flour.

SUMMARY OF THE INVENTION

In its method of preparation aspect, the present invention resides in methods of treating wheat prior to milling, essentially comprising the step of:

selecting a hard white wheat variety for milling, milling the hard white wheat into white patent flour, isolating a high bran stream, size reducing the high bran stream and sifting the size reduced high bran stream into a fine bran and bran flour fractions. The bran flour fraction is then blended with the white patent flour to form a high fiber finish flour which nonetheless is characterized by a white color.

In its principal product aspect, the present invention resides in finished whole flour products prepared from hard white wheat having a white color and a total dietary fiber content of about 2.3% to 5.8% (moisture free basis).

In still another product aspect of one and the same invention, the present invention further provides intermediate products such a bran flour a suitable for use in fortifying white patent flour in producing the present finished white flours characterized being prepared from a hard white wheat and by a whiter color than from a hard red wheat.

DETAILED DESCRIPTION OF THE PREFERRED EMBODIMENT

The present invention is directed towards milled grain products such as white wheat flour, to grain intermediate products such as milled bran flours and to their methods of preparation. Each of these products and the steps of their methods of preparation are described in detail below.

Throughout the specification and claims, percentages are by weight and temperatures in degrees Fahrenheit unless otherwise indicated.

Milling Hard White Wheat

Reference now is made to the drawing which depict the present improved milling methods 10. The present methods 10 essentially comprise the step of milling 14 cleaned tempered whole white 12 hard wheat kernels to form a white patent flour 16 fraction, a first millfeed high germ 17 fraction and a second high bran millfeed 17 fraction. Since wheat milling is generally a continuous process continuous sub-streams are produced of each fraction. Percentages of such fractions and associated continuous sub-streams are referenced to 100 pounds lbs. ("cwt.") of starting material.

The starting material herein is cleaned tempered whole white wheat kernels. In conventional flour milling as in the present methods, bulk grain is cleaned to remove dirt and small stones as well as any foreign grains, contaminants or seeds that can have been mixed in with the grain such as corn (maize). Conventionally, the grain is also tempered to adjust the moisture content of the grain to soften the outer bran layer to facilitate its removal. Conventional methods techniques and equipment can conveniently be used to provide the cleaned tempered whole grain kernels.

The starting material for use herein is cleaned dry or "milling quality" wheat kernels. Unprocessed commodity wheat is first prepared for milling in substantially conventional manner. The wheat preparing process typically involves several well-known cleaning steps to produce clean dry milling quality wheat. For example, the wheat preparing process typically involves a magnetic separator that removes iron or steel particles that dirty the wheat during harvest and transportation. Various screening steps such as reciprocating screens are also used to separate stones, sticks and other coarse and fine materials. The wheat can be fed to an air aspirator to remove other light impurities. A disc separator can be used to remove barley, oats, cockle and other foreign seeds. A scourer such as beaters in a screen cylinder scour off impurities and roughage. The various cleaning steps can be practiced in any convenient manner to provide the dry cleaned or milling quality wheat starting material for use herein. After cleaning, the grain can be tempered with water in conventional manner. Water tempers the outer bran for easier separation.

Milling quality wheat can be further characterized by a small fraction of germinated or otherwise damaged kernels and classified as US #2 or better in the classification scheme or 7 CFR §810.

The present improved methods selectively employ white hard wheat as the starting material and not red hard wheat. While available for many years as an experimental grain in small limited quantities, such grain is now increasingly available. Since 1990, the U.S. grain standards for white wheat have included in commercial bulk quantities. For example, a hard white wheat (*T. aestisum*), a class for hard white wheat having designation Idaho 377S can be used, or another variety the cross Froid/Winoka/MT 6928. Other varieties include those available under Golden 66 and Nuwest trade names. New varieties will undoubtedly be developed in the future. At present, Montana is the top hard white wheat producer. Both hard white spring wheat as well as hard white winter wheat can be used. While not critical pre se, red wheat can have at least one to as many as three genes that code for bran color. White wheat, in contrast, has no major genes for bran color. Some intermixing of hard red wheat and the desirable hard white wheat in the feed stream can occur in processing commercial quantities of bulk agricultural commodities. Desirably, the starting materials comprise at least 95%, preferably 98% or better, and for best results 99% or better hard white wheat.

Alternative to selection of the hard white wheat by variety or by absence of gene coding for bran color, the hard white wheat can be selected on the basis of color. Good starting material can be selected as having a light white color. More specifically, the color can be determined by mechanical color analysis. A wheat sample (300 g) is ground using a Foss 1093 Cyclotec® Sample Mill with a 0.5 mm screen and the color of the ground wheat is measured using a Minolta® CR310 Chroma meter with a CRA33e glass light protection tube. The color of the flour is reported using L*, a*, and b* values using a CIE illuminant C. Good results are obtained when the wheat has a color value within the range of:

L=85–90 a=0–1.5 b=8–15

In a preferred variation, the starting material whole white 12 hard wheat kernels has the following component analysis:

| Component | (%) | Testing Methodology Reference Number |
|---|---|---|
| Ash | 1.3–2.3 | AACC 08-01 |
| Fat | 1.1–2.8 | AACC 30-20 |
| Total dietary fiber | 9.1–19.3 | AOAC 991.43 |
| Insoluble dietary fiber | 8–18.2 | AOAC 991.43 |
| Soluble dietary fiber | 0.6–2.3 | AOAC 991.43 |
| Starch | 62–90 | AACC 76-11 | all results are reported as a percentage on a moisture free basis.

AACC=American Association of Cereal Chemist

AOAC=American Association of Analytical Chemists

The protein content of wheat varies widely by crop year and wheat variety. In general hard white wheat has 6–18% protein, finish fine bran has 8–22% protein, and finish flour has 5–16% protein. For purposes of the present invention, however, the starch content of the finish flour and the various flour fractions is of principal interest.

The cleaned tempered hard white wheat can be milled in conventional flour milling plants although some minor equipment modifications might be necessary to practice the to-be-described mechanical size reduction step 20. A good description of conventional milling operation is given, for example, in U.S. Pat. No. 4,986,991 (issued Jan. 22, 1991 to E. S. Posner et al.) entitled "Method of Separating Wheat Germ From Whole Wheat"; see also U.S. Pat. No. 5,194,287 (issued Apr. 14, 1992 to W. Wellman) each of which incorporated herein by reference.

Generally, the present methods essentially comprise a first step of milling the tempered whole white wheat kernels 12 into 1) a white patent flour 16 portion or sub-stream, 2) a first high bran content millfeed 17 portion or sub-stream, and, 3) a second high germ millfeed 18 portion or sub-stream.

The white patent flour 16 portion is milled conventionally and comprises about 72 to 80 pounds per 100 pounds of white wheat kernels. The skilled artisan will have no difficulty in selecting suitable equipment and techniques for preparing the white patent flour. Such equipment generally comprise a series of break rollers that size reduce the endosperm and an associated screen or sieve. The smaller particles that pass through the sieve are collected while the larger particles trapped by the sieve are passed to additional break roller pairs for further size reduction, screening, collection and trapping of larger particles. The milling process is continued and the fine flour particles collected and blended until a white flour 16 is obtained. In one embodiment, the wheat milling involves subjecting the wheat to six different rolls pairs. The first roll set or break rollers is a pair of rough or corrugated rolls. The wheat progresses through a series of progressively smoother rolls or break rollers with last roll set being a smooth roll.

By way of example, a white patent flour 16 is obtained having the following component analysis:

| Component | (%) | Testing Methodology Reference Number |
|---|---|---|
| Ash | 0.45–0.79 | AACC 08-01 |
| Fat | 1.1–2.3 | AACC 30-20 |
| Total dietary fiber | 2.3–4.5 | AOAC 991.43 |
| Insoluble dietary fiber | 1.1–3.4 | AOAC 991.43 |
| Soluble dietary fiber | 0.6–1.7 | AOAC 991.43 |
| Starch | 68–91 | AACC 76-11 | all results are reported as a percentage on a moisture free basis.

Good results are obtained when the white patent flour 16 has a particle size distribution of:

Mean volume=40–110 $\mu$m d(0.9)=80–170 $\mu$m (Determined using AACC 50-11)

and a color (measured using a Minolta CR310 Chroma meter with a CRA33e glass light protection tube). The color is reported using L*, a*, and b* values using a CIE illuminant C.

L=92–95 a=−2.0–1.0 b=7–15

As the bran and germ are separated from the endosperm, these fractions are processed and sized reduced also using various combinations of break rollers and screens. A first high bran millstream 17 is selected having the following characteristics:

| Component | (%) | Testing Methodology Reference Number |
|---|---|---|
| Ash | 3.9–6.8 | AACC 08-01 |
| Fat | 3.4–6.8 | AACC 30-20 |
| Total dietary fiber | 28–51 | AOAC 991.43 |
| Insoluble dietary fiber | 25–50 | AOAC 991.43 |
| Soluble dietary fiber | 1–4.5 | AOAC 991.43 |
| Starch | 10–35 | AACC 76-11 |

(all results are reported as a percentage on a moisture free basis)

The first high bran millstream 17 has a particle size of:

| Screen size ($\mu$m) | % Of solids caught before mechanical treatment |
|---|---|
| >706 | 0–20 |
| 420–706 | 20–90 |
| 250–420 | 5–50 |
| 178–250 | 0–15 |
| 150–178 | 0–5 |
| 125–150 | 0–5 |
| <120 | 0–5 |

In any flour milling plant, there are several mill streams that can be isolated and the stream best suited for this process will vary depending on the mill. However, generally the best mill stream to use will usually be at the tail end of the mill and will contain a substantial portion of endosperm. It is possible to use any portion of the mill feed stream, grind it to smaller than 145 $\mu$m and add it to the flour. However, the more endosperm that is in the stream chosen to be ground, the higher the increase in extraction rate without a decrease in flour quality. For example, the isolated mill stream can be a portion of the fine 5th break larger than 368 $\mu$m.

Mill stream 17 generally comprises about 10 to 20 lbs. per 100 lbs. of starting material 12.

The milling step 14 further involves forming a second high germ, low endosperm millfeed streem 18. Generally, millfeed stream 18 is a residual stream, i.e., a blend of everything else left over from the milling other that the white patent flour 16 and the millfeed stream 17. While not critical per se, millfeed stream 18 generally comprises about 5 to 15 lbs. per 100 lbs. of starting wheat material 12.

Methods 10 further essentially comprise the step of mechanically size reducing 20 the high bran millfeed stream 17 to form a size reduced or ground high bran millfead stream 22. This size reduction step 20 can be practiced using, for example and not by limitation, a sawtooth roll-stand (9 in. diameter by 30 in. length with 39 corrugations/in. and a 2 in. spiral) to grind the millfeed stream 17. The rollers are counter-rotated with a differential roll speed on the rollstand conveniently of about 1.5/1. While a sawtooth rollstand is preferred for use herein, there are numerous types of equipment that could be used to grind the isolated mill stream, e.g., a hammer mill, or pin mill.

Regardless of the specific equipment or technique used to practice the grinding step 20, the size reduced millfeed 22 is characterized by a particle size distribution of:

| Screen size (μm) | % of solids caught After mechanical treatment |
|---|---|
| >706 | 0–10 |
| 420–706 | 5–40 |
| 250–420 | 10–60 |
| 178–250 | 5–40 |
| 150–178 | 2–20 |
| 125–150 | 2–20 |
| <120 | 2–20 |

After being ground, the present methods 10 further essentially comprise the step of sifting 24 the ground millstream 22 to fractionate to form a fine bran fraction or stream 28 and a bran flour fraction or stream 26. The fine bran fraction 28 are particles larger than 145 to 165 μm and are removed or fractionated such as by using a sifter with 120 stainless steel bolting cloth (145 μm) or 105 stainless steel bolting cloth (165 μm). When a smaller screen sifter is used such less bran flour fraction 26 passes through. Yields of the recovered bran flour fraction are less but of higher quality. Conversely, when a larger screen opening sifter is used, more bran flour fraction is allowed to pass through and is recovered but can be of lower quality due to the higher amount of bran associated therewith.

Generally, the ground millstream 22 is fractionated into about 5 to 19 lbs. of fine bran stream 28 per 100 lbs. of wheat 12 and into about 1 to 10 lbs. of bran flour stream 26 per 100 lbs. of wheat 12.

The bran flour 26 can be characterized by:

| Component | (%) | Testing Methodology Reference Number |
|---|---|---|
| Ash | 1.3–4.0 | AACC 08-01 |
| Fat | 2.8–6.2 | AACC 30-20 |
| Total dietary fiber | 4.5–16.9 | AOAC 991.43 |
| Insoluble dietary fiber | 2.3–13.6 | AOAC 991.43 |
| Soluble dietary fiber | 1.1–4.5 | AOAC 991.43 |
| Starch | 45–68 | AACC 76-11 |

(all results are reported as a percentage on a moisture free basis)

The bran flour 26 has a particle size (Determined using AACC 50-11) of:
  Mean volume=40–110 μm (microns)
  $d(0.9)=80-170$ μm The bran flour 26 has a color (measured using a Minolta CR310 Chroma meter with a CRA33e glass light protection tube). The color is reported using L*, a*, and b* values using a CIE illuminant C. of:
  L=83–91
  a=−1.0–1.5
  b=8–17

The bran flour 26 is a useful intermediate product. The bran flour 26, for example, can be used for fortifying white patent flour 16 to increase the total dietary fiber content while minimizing the flavor and color disadvantages that typically result from adding such high levels of bran.

The present methods further essentially comprise the step of fortifying or blending 30 the bran flour 26 with the white patent flour 16 to form a finish white flour 40. The finish white flour 40 can comprise about 1%–10% bran flour 26 and 90% to 99% white patent flour 16. Finish white flour 40 can have a composition of:

| Component | (%) | Testing Methodology Reference Number |
|---|---|---|
| Ash | 0.47–1.10 | AACC 08-01 |
| Fat | 1.2–2.7 | AACC 30-20 |
| Total dietary fiber | 2.3–5.8 | AOAC 991.43 |
| Insoluble dietary fiber | 1.1–4.4 | AOAC 991.43 |
| Soluble dietary fiber | 0.6–2.0 | AOAC 991.43 |
| Starch | 65–91 | AACC 76-11 | all results are reported as a percentage on a moisture free basis

Good results are obtained when the finish flour 40 has a particle size distribution of:
  Mean volume=40–110 μm
  $d(0.9)=80-170$ μm, wherein "d(0.9)=80," means that 90% of the particles are smaller than 80 μm
  (Determined using AACC 50-11)

The finish flour 40 has a color (measured using a Minolta CR310 Chroma meter with a CRA33e glass light protection tube). The color is reported using L*, a*, and b* values using a CIE illuminant C) of:
  L=90–94
  a=−1.0–1.0
  b=7–15

The finished whole wheat flour 40 provided herein has a color and taste very similar to conventional white flour even though the total dietary fiber content ranges from 8% to 12% preferably about 10% to 12% provided by the bran. Moreover, the improved color is not only readily visually apparent but also can be easily measured using conventional colorometry equipment and techniques. The flour preferably ranges in pH from about 6.3 to 6.7. Optionally, the present methods can further comprise the step of (not shown enriching the finished flour 40 with a micro-nutrient selected from the group consisting of thiamine, niacin, riboflavin, iron, and mixtures thereof to form an enriched finish white wheat flour. The flour can also be fortified with minerals, e.g., calcium such as supplied by calcium carbonate, phosphate salts such as tricalcium phosphate and mixtures thereof such as in amounts sufficient to provide 0.1% to 4% calcium.

The present high quality hard white wheat flours can be used to prepare a wide variety of finished grain based food products. The flours can be used to prepare white breads, pastries, baked goods (e.g., muffins, quick breads, layer cakes), and griddle cakes such as pancakes even though the total fiber content is higher than conventional white patent flour. The high fiber hard white wheat flours can be sold in bulk or in smaller quantities, e.g., 1 kg., 1 lb or 5 lb. at retail in conventional packages. The present flours can be used as ingredients in dry mixes for such finished food products.

Still another advantage of the present finish flours 40 is their high level of dietary fiber.

In one embodiment, the methods 10 can further comprise a step of blending 42 the fine bran stream 28 with the second high germ millfeed 18 to form a finish millfeed stream 44. The finish millfeed stream 44 can generally range from about 10 to 24 Lbs. Per 100 pounds of wheat 12. The finish millfeed 44 is of low value and typically is used as livestock feed. However, in certain embodiments, (depicted in FIG. 1 by the dashed line) all or a portion of fine bran stream 28 can be marketed as a lightly colored bran ingredient suitable for incorporation or use in a variety of products intended for human consumption.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method of milling cereal grains, comprising the steps of:
   providing a quantity of tempered whole hard white wheat in kernel form having a moisture content of about 10% to 14%, having endosperm, bran and germ fractions and having starch, fiber, fat, and ash components;
   milling the tempered whole white wheat kernels into
      a predominantly endosperm white patent flour fraction having
         an starch content of about 69% to 91%;
         a fat content of about 2% to 8%,
         an ash content of about 0.45% to 0.8%, and
         a fiber content of about 2% to 8%,
      a first high bran millfeed comprising having
         an endosperm concentration of about 69% to 91% (dry weight basis);
         a germ concentration of about 2% to 8% (dry weight basis), and
         a bran fraction concentration of about 2% to 8%% (dry weight basis),
         a moisture concentration of about 12% to 14%% (dry weight basis);
         a particle size distribution of:

| | |
|---|---|
| >706 μm | 0%–20% |
| 420–706 μm | 20%–90% |
| 250–420 μm | 5%–50% |
| 178–250 μm | 0%–15% |
| 150–178 μm | 0%–5% |
| 125–150 μm | 0%–5% |
| <120 μm | 0%–5% | a second high germ content millfeed comprising about the balance of the wheat, and,
   size reducing the first high bran millfeed to form a size reduced first high bran millfeed having a particle size distribution of:

| | |
|---|---|
| >706 μm | 0%–10% |
| 420–706 μm | 5%–40% |
| 250–420 μm | 10%–60% |
| 178–250 μm | 5%–40% |
| 150–178 μm | 2%–20% |
| 125–150 μm | 2%–20% |
| <120 μm | 2%–20% | sifting the size reduced first high bran millfeed into a bran flour fraction and a fine brand fraction, and,
   blending the bran flour fraction with the white patent flour fraction to form a finish flour.

2. The method of claim 1 wherein the cereal grain is a hard white wheat not having any genes coding for bran color.

3. The method of claim 2 wherein the finish flour comprises about 78 lbs. to 86 lbs. per 100 lbs. of the wheat.

4. The product prepared by the method of claim 3.

5. The method of claim 2 wherein the finish flour comprises about 1%–10% bran flour and 90% to 99% white patent flour.

6. The method of claim 2 wherein the sifting step is practiced to provide a fine bran fraction having a particle size larger than 145 to 165 μm.

7. The method of claim 6, wherein the sifting step is practiced to fraction the ground millstream into about 5 to 19 lbs. of fine bran fraction per 100 lbs. of wheat and into about 1 to 10 lbs. of bran flour fraction per 100 lbs. of wheat.

8. The product prepared by the method of claim 6.

9. The method of claim 2 wherein the milling step is practiced employing a series of break rollers and sifters.

10. The method of claim 2 wherein the white hard wheat is a variety selected from the group consisting of Idaho 377S, the cross Froid/Winoka/MT 6928 and mixtures thereof.

11. The product prepared by the method of claim 10.

12. The method of claim 2 wherein the finish flour has a 5–16% protein content (dry weight basis).

13. The product prepared by the method of claim 12.

14. The method of claim 2 wherein the flour is fortified with calcium in amounts sufficient to provide 0.1% to 4% calcium.

15. The product prepared by the method of claim 14.

16. The method of claim 2 wherein the finish flour has a color of
   L=90–94
   a=−1.0–1.0
   b=7–15.

17. The product prepared by the method of claim 16.

18. The method of claim 1 wherein the first bran flour fraction comprises about 10 lbs. to 20 lbs. per 100 lbs. of the wheat.

19. The method of claim 18 additionally comprising the step of blending the fine bran fraction with the first low germ millfeed to form a finish millfeed.

20. The method of claim 19 additionally comprising the step of enriching the finished flour with a micro-nutrient selected from the group consisting of thiamine, niacin, riboflavin, iron, and mixtures thereof to form an enriched finish flour.

21. The product prepared by the method of claim 20.

22. The method of claim 18 additionally comprising the step of blending the fine bran with the second high germ millfeed to form a finish millfeed.

23. The product prepared by the method of claim 22.

24. The product prepared by the method of claim 18.

25. The product prepared by the method of claim 1.

26. In a flour prepared from hard wheat, the improvement comprising wherein the hard wheat is a hard white wheat, wherein the flour is a mixture of bran flour having a particle size distribution of:

| | |
|---|---|
| >706 μm | 0%–20% |
| 420–706 μm | 20%–90% |
| 250–420 μm | 5%–50% |
| 178–250 μm | 0%–15% |
| 150–178 μm | 0%–5% |
| 125–150 μm | 0%–5% |
| <120 μm | 0%–5% | and patent flour and has a white color of
   L=90–94
   a=−1.0–1.0
   b=7–15.

27. The improved wheat flour of claim 26 having a starch content of about 65% to 91%.

28. The improved white flour of claim 27 having a protein content of about 5% to 16%.

29. The improved white flour of claim 26 having a white color and a total dietary fiber content of about 2.3% to 5.8% (moisture free basis).

30. The improved white flour of claim 26 wherein the hard white wheat has no genes coding for bran color.

31. A method for fortifying a white patent flour, comprising the steps of:

providing a white patent flour; and admixing with the white patent flour with a bran flour, prepared from a hard white wheat, having

| | |
|---|---|
| Ash | 1.3–4.0% |
| Fat | 2.8–6.2% |
| Total dietary fiber | 4.5–16.9% |
| Insoluble dietary fiber | 2.3–13.6% |
| Soluble dietary fiber | 1.1–4.5% |
| Starch | 45–68 | to form a finish flour, said finish flour being formed based on an extraction rate of 78% to 86%.

32. The method of claim 31 wherein the finish flour comprises about 90% to 99% white patent flour and about 1% to 10% bran flour.

33. The method of claim 32 wherein the white patent flour is prepared from hard white wheat.

34. The method of claim 33 wherein the white patent flour is prepared from the same hard white wheat as the bran flour.

35. The method of claim 34 wherein the finish flour is fortified with micronutrients or minerals.

36. A high yield fortified white patent flour, comprising:

a white patent flour; and a bran flour, prepared from hard white wheat, having

| | |
|---|---|
| Ash | 1.3–4.0% |
| Fat | 2.8–6.2% |
| Total dietary fiber | 4.5–16.9% |
| Insoluble dietary fiber | 2.3–13.6% |
| Soluble dietary fiber | 1.1–4.5% |
| Starch | 45–68; | wherein the fortified white patent flour is formed based on an extraction rate in the order of 78% to 86%.

37. The bran flour of claim 36 having a total dietary fiber content of about 4.5% to about 17%.

38. The fortified white patent flour of claim 36, wherein the bran flour has a color of

L=83–91 a=−1.0–1.5 b=8–17.

* * * * *